United States Patent
Bürge et al.

(10) Patent No.: US 8,691,901 B2
(45) Date of Patent: Apr. 8, 2014

(54) AQUEOUS POLYMER DISPERSIONS

(75) Inventors: Christian M. Bürge, Schafisheim (CH); André Peter, Effretikon (CH); Franz Wombacher, Jonen (CH)

(73) Assignee: Sika Technology AG, Baar (CH)

( * ) Notice: Subject to any disclaimer, the term of this patent is extended or adjusted under 35 U.S.C. 154(b) by 320 days.

(21) Appl. No.: 13/320,643

(22) PCT Filed: May 12, 2010

(86) PCT No.: PCT/EP2010/056539
§ 371 (c)(1),
(2), (4) Date: Nov. 30, 2011

(87) PCT Pub. No.: WO2010/130780
PCT Pub. Date: Nov. 18, 2010

(65) Prior Publication Data
US 2012/0065301 A1  Mar. 15, 2012

(30) Foreign Application Priority Data
May 15, 2009 (EP) .................................. 09160369

(51) Int. Cl.
*C08L 33/06* (2006.01)
*C08L 33/26* (2006.01)

(52) U.S. Cl.
USPC ............ 524/249; 524/388; 524/547; 524/555

(58) Field of Classification Search
USPC .................................. 524/249, 388, 547, 555
See application file for complete search history.

(56) References Cited

U.S. PATENT DOCUMENTS

| | | | |
|---|---|---|---|
| 4,686,252 A | 8/1987 | Bürge et al. | |
| 5,084,103 A * | 1/1992 | Myers et al. | 106/727 |
| 6,387,176 B1 * | 5/2002 | Widmer et al. | 106/808 |
| 2002/0007019 A1 | 1/2002 | Schober et al. | |
| 2005/0124737 A1 | 6/2005 | Inoue et al. | |
| 2012/0270972 A1 * | 10/2012 | Maeder et al. | 524/5 |

FOREIGN PATENT DOCUMENTS

| | | |
|---|---|---|
| EP | 0 222 932 A2 | 5/1987 |
| EP | 1 138 697 A1 | 10/2001 |
| EP | 1 348 729 A1 | 10/2003 |
| EP | 1 061 089 B1 | 3/2004 |
| EP | 2 006 258 A1 | 12/2008 |
| JP | A-7-187746 | 7/1995 |
| JP | A-2001-348257 | 12/2001 |
| JP | A-2005-179152 | 7/2005 |
| WO | WO 2006/133933 A2 | 12/2006 |

OTHER PUBLICATIONS

Japanese Office Action issued in Japanese Patent Application No. 2012-510290 on Aug. 13, 2013 (with translation).
Chinese Office Action issued in Chinese Patent Application No. 201080021512.6 on Nov. 21, 2012 (with translation).
International Search Report issued in International Application No. PCT/EP2010/056539 on Jul. 12, 2010 (with translation).

* cited by examiner

Primary Examiner — Robert D. Harlan
(74) Attorney, Agent, or Firm — Oliff PLC

(57) ABSTRACT

Aqueous polymer dispersions, which, in addition to water and a dispersed copolymer composed of at least two monomers selected from the group consisting of ethylene, propylene, butylene, isoprene, butadiene, styrene, acrylonitrile, acrylic acid, methacrylic acid, acrylic acid alkyl ester, methacrylic acid alkyl ester, vinyl ester, and vinyl chloride, also comprises a comb polymer having side chains that are bound to the main chain by ester or ether groups. The aqueous polymer dispersions are particularly suited for use together with hydraulic and latently hydraulic binding agents. The aqueous polymer dispersions are extremely efficient and result in a strong increase in the mechanical values and a relevant decrease in the porosity and the water absorption property.

17 Claims, No Drawings

AQUEOUS POLYMER DISPERSIONS

TECHNICAL FIELD

The present invention relates to the field of aqueous polymer dispersions and their use together with hydraulic and latent hydraulic binders, and in particular, the field of cement and concrete technology.

PRIOR ART

The use of polymer dispersions for refinement of cementitious binders has been known for some time. The addition of commercially available aqueous polymer dispersions, however, results in the disadvantage that they must be dosed very high in order to reduce the porosity and water absorption significantly and to increase the tensile bond strengths on a smooth substrate.

EP 0 222 932A2 describes the use of an aqueous polymer dispersion having large amounts of amorphous silica to reduce the porosity of cementitious materials. As an optional component of this aqueous polymer dispersion, sulfonated amino-s-triazine resins, sulfaminic acid-melamine resins and naphthalenesulfonic acid-formaldehyde condensates are disclosed as liquefier. Sulfonated amino-s-triazine resins, sulfaminic acid-melamine resins and naphthalenesulfonic acid-formaldehyde condensates are known concrete liquefiers. However, it has proven particularly disadvantageous that the combination of polymer dispersions with these concrete liquefiers generally has major problems with respect to processability, or they must be used in extremely high doses.

DESCRIPTION

The present invention therefore addresses the problem of providing aqueous polymer dispersions which allow good processing of a hydraulic or latently hydraulic composition even when small quantities are used, and yet ensure a significant increase of the mechanical properties, a reduction of the porosity and of the water absorption of the hardened building material.

Surprisingly, it has been found that this problem can be solved by an aqueous polymer dispersion according to claim 1.

The comb polymers contained therein having side chains bound to the main chain by ester or ether groups represent a major component of the aqueous polymer dispersion and play a central role in the present invention.

It has been found that the addition of such aqueous polymer dispersions to hydraulic and latently hydraulic binders increases highly efficiently the mechanical properties thereof and reduces their porosity and water absorption. A major advantage here is that, compared with known aqueous polymer dispersions, a significantly smaller amount can be used to achieve good processing and an improvement of the mechanical properties and porosity or water absorption.

Other aspects of the invention are the subject of further independent claims. Particularly preferred embodiments of the invention are the subject of the dependent claims.

EMBODIMENTS OF THE INVENTION

In a first aspect, the present invention relates to an aqueous polymer dispersion, comprising:
 a) at least one dispersed copolymer CP, which is composed of at least two monomers, selected from the group consisting of ethylene, propylene, butylene, isoprene, butadiene, styrene, acrylonitrile, acrylic acid, methacrylic acid, alkyl acrylate, alkyl methacrylate, vinyl ester and vinyl chloride;
 b) at least one comb polymer KP having side chains that are bound to the main chain by ester or ether groups; and
 c) water.

In the present document, a "polymer dispersion" is understood to mean a dispersion of polymer particles in an aqueous phase. Particularly, a dispersion is stable for a long time, i.e., typically at room temperature for at least one week without precipitations.

A comb polymer consists of a linear polymer chain (=main chain) to which side chains are bound by ester or ether groups. The side chains are here, figuratively speaking, the "teeth" of a "comb".

The designations marked in bold such as CP, KP, DHM, VR, PEV, K1, K2, or the like in this document are rendered as such only for the sake of better reading comprehension and identification.

The polymer dispersion contains at least one dispersed copolymer CP. This polymer can be polymerized by free radical polymerization of the monomers involved. Polymerization is effected preferably by emulsion or suspension polymerization directly from the monomers, which are selected from the group consisting of ethylene, propylene, butylene, isoprene, butadiene, styrene, acrylonitrile, acrylic acid, methacrylic acid, alkyl acrylate, alkyl methacrylate, vinyl ester and vinyl chloride. Preferably, the dispersed copolymers CP are produced from two or three, more preferably from two, different monomers.

The sequence of the structures originating from the monomers may be arranged alternating, as blocks or randomly in the copolymer formed.

Preferably, the monomers have fewer than 13, more preferably fewer than 9 carbon atoms. Suitable alkyl acrylates and alkyl methacrylates are in particular butyl methacrylate, hexyl methacrylate and 2-ethylhexyl methacrylate. Suitable vinyl esters are in particular vinyl acetate, and the vinyl esters of branched fatty acids, particularly 2,2-dimethylbutyric acid, 2,2-dimethylvalerianic acid, 2,2-dimethylbutyric acid, neodecanoic acid, in particular, as sold by Shell and Hexion under the trade name Versatic™, especially Versatic™ 10. Such vinyl esters of branched fatty acids are commercially sold by Hexion, in particular, as VeoVa™ monomers, preferably VeoVa™ Monomer 9 and VeoVa™ Monomer 10.

Particularly suitable polymers are butadiene/styrene copolymers, acrylic acid/styrene copolymers, methacrylic acid/styrene copolymers, ethylene/vinyl acetate copolymers, vinyl acetate/alkyl methacrylate copolymers, and styrene/alkyl methacrylate copolymers, and styrene/alkyl methacrylate copolymers.

Most preferred as dispersed copolymer CP are butadiene/styrene copolymers.

The size of the polymer particles is preferably between 50 nanometers and 50 micrometers, preferably between 500 nanometers and 30 micrometers. Due to the particle size, the polymer dispersion is more or less opaque and naturally typically has a milky white color. Of course, any desired color may be set by the addition of dyes.

The content of dispersed copolymer CP is preferably 10%-60% by weight, especially 25%-45% by weight, based on the weight of the aqueous polymer dispersion.

Furthermore, the polymer dispersion contains at least one comb polymer KP having side chains that are bound to the main chain by ester or ether groups.

On one hand, comb polymers having side chains that are bound to the linear polymer scaffold by ether groups are suitable comb polymers KP.

Side chains that are bound to the linear polymer scaffold by ether groups may be introduced by polymerization of vinyl ethers or allyl ethers.

Such comb polymers are described, for example, in WO 2006/133933 A2, the content of which is hereby particularly incorporated by reference, are disclosed. Particularly, the vinyl ethers or allyl ethers have formula (II).

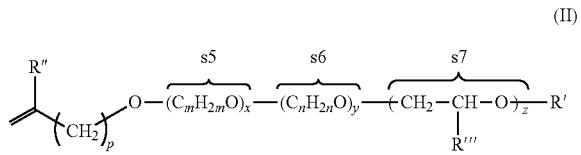

(II)

Here, R' is H or an aliphatic hydrocarbon residue having 1 to 20 carbon atoms or a cycloaliphatic hydrocarbon residue having 5-8 C atoms or an, optionally substituted, aryl residue having 6 to 14 carbon atoms. R'' is H or a methyl group and R''' is an unsubstituted or substituted aryl residue, particularly a phenyl residue.

Furthermore, p is 0 or 1; m and n are each independently 2, 3 or 4; and x and y and z are each independently values ranging from 0 to 350.

The sequence of substructure elements of formula (II) designated s5, s6 and s7 may be arranged alternating, as blocks or randomly.

In particular, such comb polymers are copolymers of vinyl ether or allyl ether with maleic anhydride, maleic acid, and/or (meth)acrylic acid.

On the other hand, comb polymers having side chains that are bound to the linear polymer scaffold by ester groups are suitable comb polymers KP. This type of comb polymers KP is preferred over the comb polymers having side chains that are bound to the linear polymer scaffold by ether groups.

Particularly preferred comb polymers KP are copolymers of formula (I).

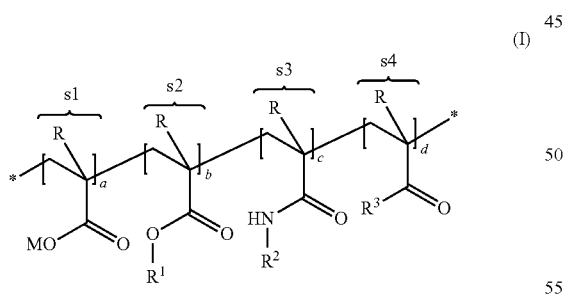

(I)

Here, M are independently $H^+$, alkali metal ion, alkaline earth metal ion, divalent or trivalent metal ion, ammonium ion, or organic ammonium group. In the present document, the term "independently" is understood to mean that in the same molecule a substituent can have different available meanings. For example, the copolymer of formula (I) may have, at the same time, carboxylic acid groups and sodium carboxylate groups, i.e., in this case for M means $H^+$ and $Na^+$ independently.

It is obvious to the person skilled in the art that, on the one hand, it is a carboxylate, to which the ion M is bound, and that, on the other hand, in the case of multivalent ions M the charge must be balanced by counterions.

Furthermore, the substituents R are each independently hydrogen or a methyl group.

Furthermore, the substituents $R^1$ are each independently -$[AO]_q$—$R^4$. The substituents $R^2$ are each independently a $C_1$- to $C_{20}$-alkyl group, -cycloalkyl group, -alkylaryl group, or -$[AO]_q$—$R^4$. In both cases, the substituent A is independently a $C_2$— to $C_4$-alkylene group and $R^4$ is a $C_1$- to $C_{20}$-alkyl group, -cyclohexyl group or alkylaryl group, while q is a value from 2 to 250, particularly from 8 to 200, more preferably from 11 to 150.

Furthermore, the substituents $R^3$ are each independently $NH_2$, —$NR^5R^8$, —$OR^7NR^8R^9$. Here, $R^5$ and $R^6$ are each independently a $C_1$- to $C_{20}$-alkyl group, -cycloalkyl group or -alkylaryl group or -aryl group or a hydroxyalkyl group, or an acetoxyethyl ($CH_3$—CO—O—$CH_2$—$CH_2$—) or a hydroxyisopropyl (HO—$CH(CH_3)$—$CH_2$—) or an acetoxyisopropyl ($CH_3$—CO—O—$CH(CH_3)$—$CH_2$—) group; or $R^5$ and $R^6$ together form a ring, of which nitrogen is a part, to build a morpholine or imidazoline ring.

Furthermore, the substituents $R^8$ and $R^9$ are each independently a $C_1$- to $C_{20}$-alkyl group, -cycloalkyl group, -alkylaryl group, -aryl group or a hydroxyalkyl group.

The sequence of substructure elements of formula (I) designated s1, s2, s3 and s4 may be arranged alternating, as blocks or randomly.

Finally, indices a, b, c and d are the molar ratios of the structural units s1, s2, s3 and s4. These structural elements have a ratio of a/b/c/d=(0.1-0.9)/(0.1-0.9)/(0-0.8)/(0-0.3), particularly a/b/c/d=(0.1-0.9)/(0.1-0.9)/(0-0.5)/(0-0.1), preferably a/b/c/d=(0.1-0.9)/(0.1-0.9)/(0-0.3)/(0-0.06), provided that a+b+c+d=1. Preferably, the sum c+d is greater than 0.

Comb polymers KP of formula (I) may be produced, on the one hand, by radical polymerization of the corresponding monomers of formula (III$_a$), (III$_b$), (III$_c$) and (IIId), respectively, which result in structural elements of structural units s1, s2, s3 and s4,

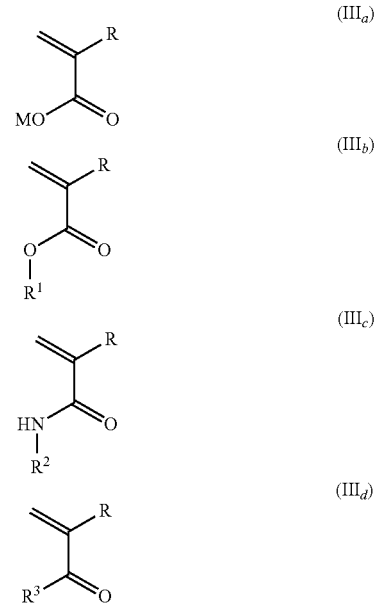

or, on the other hand, by a so-called polymer-analogous reaction of a polycarboxylic acid of formula (IV)

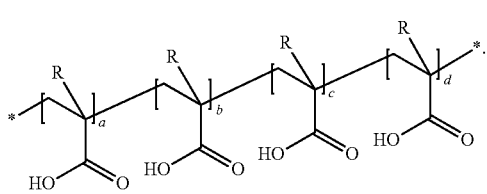

In the polymer-analogous reaction, the polycarboxylic acid of formula (IV) is esterified or amidated with the corresponding alcohols, amines, and then optionally neutralized or partially neutralized (depending on the type of residue M, e.g., using metal hydroxides or ammonia). Details of the polymer-analogous reaction are disclosed, for example, in EP 1 138 697 B1 on page 7, line 20 to page 8, line 50, and in the examples therein, or in EP 1 061 089 B1 on page 4, line 54 to page 5, line 38 and in the examples therein. In a variation thereof, as described in EP 1 348 729 A1 on page 3 to page 5 and in the examples therein, the comb polymer KP of formula (I) may be produced in the solid state. Particularly, the disclosure of these just-mentioned patents is hereby incorporated by reference.

It has been found that a particularly preferred embodiment of the comb polymers KP of formula (I) are those in which c+d>0, in particular d>0. As residue $R^3$, —NH—CH$_2$—CH$_2$—OH has proved particularly advantageous.

Particularly advantageous are comb polymers KP, such as those sold commercially by Sika Schweiz AG under the trade name series ViscoCrete®.

The content of comb polymer KP is preferably 1%-20% by weight, particularly 5%-15% by weight, based on the weight of the aqueous polymer dispersion.

Furthermore, the aqueous polymer dispersion comprises water. The water content is preferably 20%-80% by weight, particularly 30%-70% by weight, based on the weight of the aqueous polymer dispersion.

Typically, aqueous polymer dispersions are produced by adding the comb polymer KP to an already previously produced dispersion of the copolymer CP in water. Typically, the addition is carried out under vigorous stirring. It can sometimes be helpful to dissolve, emulsify or disperse comb polymers KP in water before mixing.

For producing the dispersion, the use of high speed mixers, particularly dissolvers or Ystral mixers (Ystral GmbH, Germany), is recommended.

It has proven advantageous when the aqueous polymer dispersion further comprises
  d) at least one dispersing agent DHM, preferably poly (meth)acrylic acid.

Dispersing agents themselves are known aids that are useful for generating a dispersion. Particularly, such dispersing agents DHM feature surface active groups. Particularly, surfactants such as alkoxylated phenols, for example, alkoxylated isononylphenol or alkoxylated nonylphenol are suitable dispersing agents.

A particularly suitable dispersing agent DHM is poly (meth)acrylic acid, preferably acrylic acid.

It has been shown that by using poly(meth)acrylic acid particularly the storage stability of the aqueous dispersion can be improved.

The content of dispersing agent DHM is preferably 3% by weight or less, advantageously 0.1%-3% by weight, based on the weight of the aqueous polymer dispersion.

Furthermore, the aqueous polymer dispersion advantageously comprises at least one viscosity-regulating agent.

It has proven particularly advantageous when the aqueous polymer dispersion comprises
  e) at least one monovalent or multivalent alcohol or a glycol ether or a urea or amide of formula (V) as a viscosity-regulating agent VR.

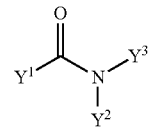

Here, $Y^1$ is NH$_2$ or a branched or unbranched alkyl group having 1 to 6 carbon atoms; or $Y^1$ together with $Y^2$ is a divalent residue which, together with the amide group, forms a 5- to 8-membered ring.

$Y^2$ is H or a branched or unbranched alkyl group having 1 to 6 carbon atoms, particularly a methyl group; or $Y^2$ together with $Y^1$ is a divalent residue which, together with the amide group, forms a 5- to 8-membered ring.

$Y^3$ is H or a branched or unbranched alkyl group having 1 to 6 carbon atoms, particularly a methyl group.

Particularly suitable are the viscosity-regulating agents VR polyethylene glycol dimethyl ether or N-methylpyrrolidone.

Primarily, viscosity-regulating agents VR have a diluting effect on the aqueous dispersion. It is also entirely possible, however, to use viscosity-regulating agents that have a thickening effect, so that, for example, a gel-like consistency is achieved, which may be advantageous for dosing the aqueous dispersion.

The content of viscosity-regulating agent VR is preferably 15% by weight or less, advantageously 1%-10% by weight, based on the weight of the aqueous polymer dispersion.

The addition of dispersing agents DHM, particularly poly (meth)acrylic acid and/or viscosity-regulating agents VR, is very advantageous for the stability, particularly the storage stability, of the aqueous polymer dispersion.

Furthermore, it has proven particularly advantageous when the aqueous polymer dispersion is acidic, particularly having a pH between 5 and 7.

It has proven advantageous when the aqueous polymer dispersion further comprises
  g) at least one pyrogenic or colloidal silica.

Pyrogenic silica is produced in the manner known to the person skilled in the art. By the combustion process, particularly by flame hydrolysis, very fine SiO$_2$ particles are produced from silanes. Such pyrogenic silicas are sold, for example, by Evonik, formerly Degussa, under the trade name Aersosil® or by Cabot Corp. under the name Cab-O-Sil®.

Furthermore, so-called Silica Fume, which is obtained as a byproduct in the production of elemental silicon and silicon alloys, is referred to as pyrogenic silica.

Particularly advantageously, the pyrogenic silica has a specific surface area (BET) according to Brunauer-Emmett-Teller of 10-400 m$^2$/g, preferably from 150-250 m$^2$/g.

Colloidal silica is finely divided amorphous, non-porous and typically spherical silica particles, which are present in water as a suspension. Typically, colloidal silica is produced via a multistep process in which an alkali silicate solution is partially neutralized. Preferred colloidal silica is so-called Silica-Sol.

Advantageously, the colloidal silica has a particle size of 0.1 to 100 nm, preferably from 10 to 20 nm. On the one hand, the colloidal silica may be a monodisperse suspension. On the other hand, it may be advantageous when the colloidal silica forms a polydisperse suspension.

Particularly, the addition of pyrogenic or colloidal silica results in increased chemical resistance of the products formed from the aqueous polymer dispersion and a cementitious binder, as the free lime of the cement is bound by the added silica, and the alkali-silicate reaction is prevented.

Preferably, the content of pyrogenic or colloidal silica is 50% by weight or less, particularly 10%-30% by weight, based on the weight of the aqueous polymer dispersion.

Furthermore, it has proven advantageous when the aqueous polymer dispersion further comprises
 h) at least one phosphorus atom-containing compound PEV, which is preferably an orthophosphoric acid, pyrophosphoric acid, polyphosphoric acid or an acidic salt of the orthophosphoric acid, pyrophosphoric acid or polyphosphoric acid.

Preferably, the content of phosphorus atom-containing compound PEV is 30% by weight or less, particularly 2%-10% by weight, based on the weight of the aqueous polymer dispersion.

Furthermore, it has proven advantageous when the aqueous polymer dispersion further comprises
 i) at least one polyhydroxy compound or a phosphate.

Preferably, the content of polyhydroxy compound or phosphate is 15% by weight or less, particularly 2%-10% by weight, based on the weight of the aqueous polymer dispersion.

Furthermore, it has proven advantageous when the aqueous polymer dispersion further comprises
 j) at least one calcium sulfate or amorphous aluminum hydroxide.

Preferably, the content of calcium sulfate or amorphous aluminum hydroxide is 15% by weight or less, particularly 3%-10% by weight, based on the weight of the aqueous polymer dispersion.

The aqueous polymer dispersion may also comprise other components typical of aqueous dispersions, such as biocides, particularly fungicides and/or algaecides.

Aqueous polymer dispersions, which comprise or consist of the following components, have proven particularly advantageous:
10%-60% by weight, particularly 25%-45% by weight of dispersed copolymer CP;
1%-20% by weight, particularly 5%-15% by weight of comb polymer KP;
20%-80% by weight, particularly 30%-70% by weight of water;
0%-5% by weight, particularly 0.1%-3% by weight of dispersing agent DHM, preferably poly(meth)acrylic acid;
0%-15% by weight, particularly 1%-10% by weight of viscosity-regulating agent VR;
0%-50% by weight, particularly 10%-30% by weight of pyrogenic or colloidal silica;
0%-30% by weight, particularly 2%-10% by weight of phosphorus atom-containing compound PEV;
0%-15% by weight, particularly 3%-10% by weight of calcium sulfate or amorphous aluminum hydroxide.

The %-by-weight values are based on the weight of the aqueous polymer dispersion The aqueous polymer dispersion is preferably produced in the manner that the comb polymer KP is stirred into water, then, optionally, dispersing agents DEM and viscosity-regulating agents VR are stirred in. Then, the copolymer CP dispersed in water is stirred in, followed, optionally, by pyrogenic and colloidal silica. If phosphorus atom-containing compounds PEV and/or amorphous aluminum hydroxide or calcium sulfate are components of the aqueous polymer dispersion, they may be stirred in at any time during the production process. Stirring in of the components is preferably carried out by high speed stirring using a suitable mixer such as a dissolver or a mixer from Ystral GmbH, Germany.

It is important to ensure that the aqueous polymer dispersion is not stored at temperatures below 0° C., as by freezing of the dispersion the dispersion is destroyed upon thawing, in that the dispersed polymer precipitates and does not redisperse on its own. It is also advantageous not to store the aqueous polymer dispersion at too high temperatures, as this is also detrimental to the stability of the aqueous polymer dispersion.

These above-described aqueous polymer dispersions may be used widely. Particularly, they may be used in combination with an inorganic binder.

Particularly advantageously, the above-described aqueous polymer dispersions are used as additives in bonding slurries or mortar or concrete.

In a further aspect, the present invention relates to a multi-component composition which comprises at least a first component K1 and a second component K2. Here, the first component K1 comprises an aqueous polymer dispersion as described above in detail. Furthermore, the second component K2 comprises a hydraulic or latently hydraulic binder.

According to the usual definition, a hydraulic binder is an inorganic binder which hardens under the influence of water both in air and under water.

According to the usual definition, latently hydraulic binders are inorganic binders which harden under the influence of water only by stimulators.

Particularly, the hydraulic or latently hydraulic binder is a cement or a blended cement. Particularly, a blended cement is a mixture of cement and fly ash or slag or pozzolan. Preferably, the cement is a Portland cement, white cement or calcium aluminate cement. It is understood that mixtures of various cements and/or of blended cements may also be used. Most preferably, the hydraulic or latently hydraulic binder is Portland cement.

As further components, the multi-component composition may comprise further components, particularly as the component of the second component K2. In particular, these components include aggregates, accelerators, retarders, shrinkage-reducing agents, defoamers, organic solvents and concrete liquefiers.

Particularly suitable aggregates are natural calcareous or siliceous sands, gravel, quartz, basalt, silicon carbide, aluminum oxide, boron carbide, iron, iron carbide, expanded clay, expanded slate, perlite, vermiculite, foamed plastics, glass microspheres, polymer microspheres and expanded fly ash.

Particularly suitable concrete liquefiers include, in addition to polycarboxylates, lignin sulfonates, naphthalene-sulfonic acid-formaldehyde condensates, sulfonated melamine-formaldehyde condensates, amino-s-triazine resins, sulfaminic acid-melamine resins and naphthalene sulfonic acidformaldehyde condensates or polycarboxylate ethers. Preferred liquefiers are, however, polycarboxylates.

These additional materials may be components of the second component K2 or of other components, such as a third component K3 and/or a fourth component K4. The latter is particularly the case when the multi-component composition contains components, which are more or less reactive toward the first component K1 and/or the second component K2 and which, in particular, are supposed to react only during hardening of the multi-component composition, or which may negatively affect the stability of the aqueous dispersion. By shifting these components to the third component K3, or optionally, to another component, storage stability problems can be solved very efficiently. However, in multi-component compositions of three or more components, there is an increased potential for problems with the quality of mixing of the individual components, so that such a composition is more error-prone, and is increasingly deemed user-unfriendly and complicated because of the necessity of mixing the plurality of components, and has disadvantages in terms of warehousing and logistics.

For these reasons in particular, it is preferred that the multi-component composition is a two-component composition, consisting of the aforementioned first component K1 and second component K2.

In use, the two components K1 and K2 and, optionally, other components are mixed together, triggering a hardening of the described multi-component composition. This hardening is based in particular on the reaction of the hydraulic or latently hydraulic binder with water.

Thus, a further subject of the present invention is a hardened composition, which was obtained after the mixing of a multi-component composition as described above.

Due to the fact that the aqueous polymer dispersions described above, particularly in the form of the multi-component compositions, are used particularly advantageously in the field of civil engineering and building construction, a structure of civil engineering or building construction, which a hardened composition as described above, is another aspect of the present invention.

As regards the use of the aqueous polymer dispersion together with hydraulic and latently hydraulic binders, it has been shown that the inventive aqueous polymer dispersions, as compared with non-inventive aqueous polymer dispersions that use other concrete liquefiers, particularly sulfonated amino-s-triazine resins, sulfaminic acid-melamine resins or naphthalenesulfonic acid-formaldehyde condensates instead of the comb polymer KP, have markedly improved processing at the same water/cement ratio and the same concentration.

Surprisingly, it has been found that the above-described inventive aqueous polymer dispersion, as compared with corresponding non-inventive polymer dispersions in combination with a hydraulic or latently hydraulic binder, have a significantly greater increase in mechanical strengths, particularly in tensile bond strengths according to standard EN 1542, flexural strength and compressive strength according to standard EN 196-1 (4×4×16 cm prisms), and greatly reduced water absorption, characterized by the water absorption coefficient according to standard DIN 52617.

On one hand, this makes it possible to obtain building materials with greatly improved properties or, on the other hand, to reduce substantially the amount of polymer dispersion to be used.

It has been found that a reduction of up to 30% by weight, particularly up to 33%, sometimes even up to 40% by weight, compared with the corresponding non-inventive polymer dispersions, is possible using aqueous polymer dispersions according to the present invention, without deterioration of the mechanical properties and of water absorption. These savings are, of course, particularly advantageous, particularly in financial terms.

Furthermore, it has been found that this increase in mechanical properties and reduction of water absorption, with the same amount of inventive polymer dispersions as compared with non-inventive polymer dispersions, is particularly marked particularly at the beginning of the hardening processes.

The porosity or water absorption behavior of the hardened building material is crucial for the strength, durability, tightness, adhesive strength, wear resistance and many other functional characteristics. Here, the porosity is in inverse proportion to the quality and durability, i.e., the lower the porosity the higher the quality and the durability, respectively.

By the extent of the reduction in porosity and water absorption achieved by the addition of the inventive aqueous polymer dispersions, building materials are obtained which can essentially be described as water-tight. For example, the porosity of a cement matrix according to standard EN 480-11 may be decreased by up to 85%.

Furthermore, such high tensile bond strengths are achieved that allow coatings to be anchored on smooth surfaces such that in the tensile test they do not tear in the adhesive layer.

It has also been found that such building materials are also characterized by an extremely high sulfate resistance (measured by the method similar to ASTM C-1012-95).

EXAMPLES

Production of Polymer Dispersions

The polymer dispersion SIKALATEX®, commercially available from Sika France S.A., is a styrene/butadiene dispersion having a polymer content of 46% by weight. Hereinafter, this comparative polymer dispersion is referred to as Ref.Disp.

9 parts by weight of a 19.44% aqueous solution of Sika® ViscoCrete®-125 (comb polymer with poly(oxyalkylene)-alkyl ether side chains bound by ester groups, corresponding to formula (I)) and 0.05 parts by weight of a defoamer (polyoxyalkylene alkyl ether fatty acid ester) were added to 100 parts by weight SIKALATEX® under vigorous stirring using a mixer from Ystral GmbH, Germany. Hereinafter, this polymer dispersion is referred to as Disp.1.

For comparison, comparative dispersions Ref.Disp.1, Ref.Disp2 and Ref.Disp.3 were prepared, which correspond to the polymer dispersion Disp.1 in which the amount of Sika® ViscoCrete®-125 was replaced by the corresponding amount of Sikament® FF-86 (Sika Austria GmbH, comprising sulfonic acid-melamine-formaldehyde condensate), Sikament® 210 (Sika Schweiz AG, comprising naphthalenesulfonic acid-formaldehyde condensate) or sodium lignosulfonate, such that in each dispersion the same amount of sulfonic acid-melamine-formaldehyde condensate, naphthalenesulfonic acid-formaldehyde condensate or sodium lignosulfonate was present as was comb polymer of Sika® ViscoCrete®-125 in Disp.1.

Comparative dispersions Ref.Disp.1-2, Ref.Disp.2-2 and Ref.Disp.3-2 contained even more Sikament® FF-86, Sikament® 210 or sodium lignosulfonate, such that in each dispersion twice the amount of sulfonic acid-melamine-formaldehyde condensate, naphthalenesulfonic acid-formaldehyde condensate or sodium lignosulfonate was present as was comb polymer of Sika® ViscoCrete®-125 in Disp.1.

Preparation of Mortar Compositions

Mortar compositions were prepared by intensive mixing in a Hobart mixer according to the parts by weight of Portland cement, sand (0-3 mm), water, and optionally polymer dispersions or comb polymer specified in Table 1 and Table 2.

The amount of additional water is calculated such that all compositions have a water/cement ratio of 0.40.

TABLE 1

Mortar compositions.

|  | Ref. 1 | Ref. 2 | Ref. 3 | 1 | 2 |
|---|---|---|---|---|---|
| Portland cement | 100 | 100 | 100 | 100 | 100 |
| Sand | 300 | 300 | 300 | 300 | 300 |
| Ref. disp. |  | 15.7 |  |  |  |
| Disp. 1 |  |  |  | 15.7 | 10.4 |
| Sika ® ViscoCrete ®-125 |  |  | 0.17 |  |  |
| Water | 40 | 31.6 | 40 | 31.2 | 34.2 |

TABLE 2

Mortar compositions with inventive and non-inventive polymer dispersions.

|  | 2 | Ref. 4 | Ref. 5 | Ref. 6 | Ref. 4' | Ref. 5' | Ref. 6' |
|---|---|---|---|---|---|---|---|
| Portland cement | 100 | 100 | 100 | 100 | 100 | 100 | 100 |
| Sand | 300 | 300 | 300 | 300 | 300 | 300 | 300 |
| Disp. 1 | 10.4 |  |  |  |  |  |  |
| Ref. disp. 1 |  | 10.4 |  |  |  |  |  |
| Ref. disp. 2 |  |  | 10.4 |  |  |  |  |
| Ref. disp. 3 |  |  |  | 10.4 |  |  |  |
| Ref. disp. 1-2 |  |  |  |  | 10.4 |  |  |
| Ref. disp. 2-2 |  |  |  |  |  | 10.4 |  |
| Ref. disp. 3-2 |  |  |  |  |  |  | 10.4 |
| Water | 34.2 | 34.2 | 34.2 | 34.2 | 34.2 | 34.2 | 34.2 |

Tensile bond strengths were determined according to standard EN 1542 after 14, 28 and 56 days, the flexural strength and compressive strength according to standard EN 196-1 (4×4×16 cm prisms) after 1 day, 7 and 28 days, and the water absorption coefficient according to standard DIN 52617 after 28 days, and are shown in Table 3. Furthermore, Table 3 shows the percentage change "$\Delta_{Ref.2}$" of the value of Example 1 or 2 relative to the corresponding value of the Comparative Example Ref.2.

TABLE 3

Properties of the mortar compositions.

|  | Ref. 1 | Ref. 2 | Ref. 3 | 1 | 2 |
|---|---|---|---|---|---|
| Tensile bond strength |  |  |  |  |  |
| after 14 d [N/mm²] | 2.8 | 4.3 | 3.0 | 6.6 | 4.7 |
| $\Delta_{Ref.2}$ |  |  | −30% | +53% | +9% |
| after 28 d [N/mm²] | 2.9 | 4.6 | 3.1 | 6.7 | 4.8 |
| $\Delta_{Ref.2}$ |  |  | −33% | +46% | +4% |
| after 56 d [N/mm²] | 2.9 | 4.9 | 3.1 | 6.7 | 5.1 |
| $\Delta_{Ref.2}$ |  |  | −37% | +37% | +4% |
| Flexural strength |  |  |  |  |  |
| after 1 d [N/mm²] | 4.2 | 4.9 | 5.3 | 5.1 | 5.5 |
| $\Delta_{Ref.2}$ |  |  | +8% | +4% | +12% |
| after 7 d [N/mm²] | 6.8 | 8.1 | 8.4 | 8.2 | 8.5 |
| $\Delta_{Ref.2}$ |  |  | +4% | +1% | +5% |
| after 28 d [N/mm²] | 6.6 | 9.5 | 9.6 | 10.1 | 9.5 |
| $\Delta_{Ref.2}$ |  |  | +1% | +6% | +0% |
| Compressive strength |  |  |  |  |  |
| after 1 d [N/mm²] | 15.4 | 20.5 | 24.9 | 22.6 | 27.1 |
| $\Delta_{Ref.2}$ |  |  | +21% | +10% | +32% |
| after 7 d [N/mm²] | 36.3 | 41.5 | 54.8 | 39.1 | 50.6 |
| $\Delta_{Ref.2}$ |  |  | +32% | −6% | +22% |
| after 28 d [N/mm²] | 41.5 | 46.9 | 51.1 | 45.2 | 57.6 |
| $\Delta_{Ref.2}$ |  |  | +9% | −4% | +23% |
| Water absorption coefficient [g/m² · h^{0.5}] | 1066 | 113 | 512 | 69 | 106 |
| $\Delta_{Ref.2}$ |  |  | +353% | −39% | −6% |

The results in Table 3 show that by adding already known polymer dispersions (Ref.2) a strong increase in mechanical strength or reduction of porosity (characterized by the water absorption coefficient) as compared with the corresponding compositions without polymer dispersions (Ref.1) may be achieved, however, this effect is greatly increased by the aqueous inventive polymer dispersions (1, 2). The comparison of Examples 2 with 1 or Ref.2 shows that despite the reduction of the aqueous polymer dispersion by around 33%, it is still possible to achieve higher mechanical properties or reduced water absorption than when using the corresponding non-inventive polymer dispersion. The results of Table 3 also show that the improvement of mechanical properties is particularly marked, particularly in measurements after short hardening times (after 7 days, particularly after 1 d in flexural strength and compressive strength, or after 14 days in tensile bond strength).

The comparison of Comparative Example Ref.3 with Example 2 shows that the use of the comb polymer alone (i.e., not in the form of an aqueous polymer dispersion) in the same amount results in a strong increase of water absorption and a strong reduction in tensile bond strength.

From Example 2 and Comparative Examples Ref.4, Ref.5, Ref.6, Ref.4', Ref.5' and Ref.6', the flow diameter at 0 min ("ABM"), 30 min ("$ABM_{30}$"), 60 min ("$ABM_{60}$") and 90 min ("$ABM_{90}$") was determined according to EN 1015-3, and the air content at 0 min according to EN 196-1 and listed in Table 4.

TABLE 4

Processing characteristics of mortar compositions.

|  | 2 | Ref. 4 | Ref. 5 | Ref. 6 | Ref. 4' | Ref. 5' | Ref. 6' |
|---|---|---|---|---|---|---|---|
| $ABM_0$ [mm] | 194 | 137 | 138 | 137 | 137 | 139 | 148 |
| $ABM_{30}$ [mm] | 170 | 132 | 129 | 130 | 130 | 130 | 134 |
| $ABM_{60}$ [mm] | 156 | S | S | S | S | S | S |
| $ABM_{90}$ [mm] | 146 | S | S | S | S | S | S |
| Air content [%] | 3.5 | 4.0 | 4.1 | 4.5 | 4.5 | 4.2 | 4.2 |

S = stiffened, i.e., the flow diameter can no longer be determined.

From Table 4 it is evident that the comb polymer as a component in the inventive aqueous polymer dispersions results in significant advantages in terms of processability. Compared with the corresponding polymer dispersions which, instead of a comb polymer KP, contain sulfonic acidmelamine-formaldehyde condensate (Ref.4), naphthalene sulfonic acid-formaldehyde condensate (Ref.5) or sodium lignosulfonate (Ref.6) in the same amount, Example 2 at the identical water/cement ratio has a significantly higher flow diameter and a very significantly reduced air content. Even with a doubling of the proportion of the liquefier (Ref.4' (comprising sulfonic acid-melamine-formaldehyde condensate), Ref.5' (comprising naphthalene sulfonic acid-formaldehyde condensate) and Ref.6' (comprising sodium lignosulfonate)), the poor processability is improved only insignificantly and the air content is reduced only insignificantly. In any of the comparative examples, the flow diameter could no longer be determined after 60 minutes or after 90 minutes because the compositions were stiffened by this time. The flow diameters determined for inventive Example 2, however, bear witness to a very good processability.

The invention claimed is:
1. An aqueous polymer dispersion comprising
   a) at least one dispersed copolymer, which is composed of at least two monomers selected from the group consisting of ethylene, propylene, butylene, isoprene, butadiene, styrene, acrylonitrile, acrylic acid, methacrylic acid, alkyl acrylate, alkyl methacrylate, vinyl ester and vinyl chloride;
   b) at least one comb polymer having side chains that are bound to the main chain by ester or ether groups; and
   c) water.
2. An aqueous polymer dispersion according to claim 1, wherein the comb polymer is a copolymer of vinyl ether or allyl ether and maleic anhydride and/or maleic acid and/or (meth)acrylic acid.
3. An aqueous polymer dispersion according to claim 1, wherein the comb polymer is a copolymer of formula (I)

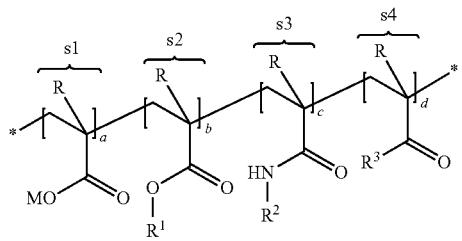

(I)

wherein
M is independently $H^+$, alkali metal ion, alkaline earth metal ion, divalent or trivalent metal ion, ammonium ion or organic ammonium group;
R is, each independently of the other residues R in formula (I), hydrogen or a methyl group;
$R^1$ is independently $-[AO]_q-R^4$;
$R^2$ is independently a $C_1$- to $C_{20}$-alkyl group, -cycloalkyl group, -alkylaryl group or $-[AO]_q-R^4$,
wherein A is a $C_2$- to $C_4$-alkylene group and $R^4$ is a $C_1$- to $C_{20}$-alkyl group, -cyclohexyl group or alkylaryl group; and q=2-250;
$R^3$ is independently $-NH_2$, $-NR^5R^6$ or $-OR^7NR^8R^9$,
wherein $R^5$ and $R^6$ are each independently a $C_1$- to $C_{20}$-alkyl group, -cycloalkyl group or -alkylaryl group or -aryl group;
or
is a hydroxyalkyl group, or is an acetoxyethyl ($CH_3-CO-O-CH_2-CH_2-$) or a hydroxy-isopropyl ($HO-CH(CH_3)-CH_2-$) or an acetoxyisopropyl group ($CH_3-CO-O-CH(CH_3)-CH_2-$),
or $R^5$ and $R^6$ together form a ring, of which nitrogen is a part, to build a morpholine or imidazoline ring;
wherein $R^7$ is a $C_2$-$C_4$ alkylene group;
and $R^8$ and $R^9$ are each independently a $C_1$- to $C_{20}$-alkyl group, -cycloalkyl group, -alkylaryl group, -aryl group or a hydroxyalkyl group
and wherein a, b, c and d are the molar ratios of the structural units s1, s2, s3 and s4
and a/b/c/d=(0.1-0.9)/(0.1-0.9)/(0-0.8)/(0-0.3) provided that a+b+c+d=1.
4. An aqueous polymer dispersion according to claim 1, wherein the aqueous polymer dispersion further comprises
   d) at least one dispersing agent.
5. An aqueous polymer dispersion according to claim 1, wherein the aqueous polymer dispersion further comprises
   e) at least one monovalent or multivalent alcohol or a glycol ether or a urea or amide of formula (V) as a viscosity-regulating agent VR,

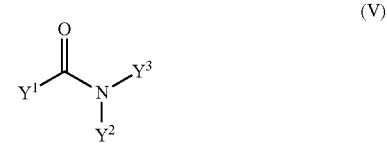

(V)

wherein
$Y^1$ is $NH_2$ or a branched or unbranched alkyl group having 1 to 6 carbon atoms, or together with $Y^2$ is a divalent residue which, together with the amide group, forms a 5- to 8-membered ring;
$Y^2$ is H or a branched or unbranched alkyl group having 1 to 6 carbon atoms, or together with $Y^1$ is a divalent residue which, together with the amide group, forms a 5- to 8-membered ring;
$Y^3$ is H or a branched or unbranched alkyl group having 1 to 6 carbon atoms.
6. An aqueous polymer dispersion according to claim 1, wherein the aqueous polymer dispersion further comprises
   g) at least one pyrogenic or colloidal silica.
7. An aqueous polymer dispersion according to claim 1, wherein the aqueous polymer dispersion further comprises
   h) at least one phosphorus atom-containing compound.
8. An aqueous polymer dispersion according to claim 1, wherein the aqueous polymer dispersion further comprises
   i) at least one polyhydroxy compound or a phosphate.
9. An aqueous polymer dispersion according to claim 1, wherein the aqueous polymer dispersion further comprises
   j) at least a calcium sulfate or an amorphous aluminum hydroxide.
10. An aqueous polymer dispersion according to claim 1, wherein the aqueous polymer dispersion comprises the following components:
   10%-60% by weight of dispersed copolymer;
   1%-20% by weight of comb polymer;
   20%-80% by weight of water;
   0%-5% by weight of dispersing agent;
   0%-15% by weight viscosity-regulating agent;
   0%-50% by weight of pyrogenic or colloidal silica;
   0%-30% by weight of phosphorus-containing compound;
   0%-15% by weight of calcium sulfate or amorphous aluminum hydroxide;

wherein the %-by-weight values are based on the weight of the aqueous polymer dispersion.

11. A multi-component composition comprising at least a first component and a second component,
wherein
the first component comprises an aqueous polymer dispersion according to claim 1; and
the second component comprises a hydraulic or latently hydraulic binder.

12. Multi-component composition according to claim 11, wherein the hydraulic or latently hydraulic binder is a cement.

13. A hardened composition which was obtained after mixing a multi-component composition according to claim 11.

14. A structure of civil engineering or building construction comprising a hardened composition according to claim 13.

15. A method of making a composition, comprising:
adding the aqueous polymer dispersion according to claim 1 to bonding slurries.

16. A method of making a composition, comprising:
adding the aqueous polymer dispersion according to claim 1 to a mortar.

17. A method of making a composition, comprising:
adding the aqueous polymer dispersion according to claim 1 to a concrete.

\* \* \* \* \*